United States Patent Office 3,502,678
Patented Mar. 24, 1970

3,502,678
NITROBENZOTHIOXANTHENE DICARBOXYLIC ACID IMIDE
Otto Fuchs and Helmut Troster, Frankfurt am Main, Germany, assignors to Farbwerke Hoechst Aktiengesellschaft vormals Meister Lucius & Bruning, Frankfurt am Main, Germany, a corporation of Germany
No Drawing. Continuation-in-part of application Ser. No. 567,813, July 26, 1966. This application Oct. 23, 1967, Ser. No. 677,473
Claims priority, application Germany, Aug. 12, 1965, F 46,869
Int. Cl. C07d *39/16*
U.S. Cl. 260—281                7 Claims

ABSTRACT OF THE DISCLOSURE

Benzothioxanthene dicarboxylic acid imide dyestuffs which are substituted in the 1-position by a nitro group and in the 6-position by an alkoxy group. The dyestuffs have a red or bluish red shade and are suitable for dyeing synthetic materials such as polyethylene-glycolterephthalate.

---

This application is a continuation-in-part of our copending application Ser. No. 567,813 filed July 26, 1966, now abandoned, copending application Ser. No. 565,680 filed July 18, 1966, now U.S. Patent No. 3,357,985, and copending application Ser. No. 475,279 filed July 27, 1965, now U.S. Patent No. 3,367,937.

The present invention relates to new, valuable benzothioxanthene dyestuffs and to a process for preparing them, in particular, to dyestuffs of the formula

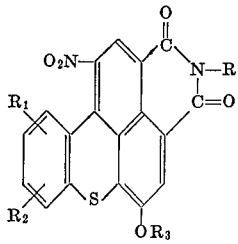

in which R represents a hydrogen atom, a hydroxy, amino, analkyl, cycloalkyl, aryl, aralkyl or a heterocyclic group $R_1$ and $R_2$ represent hydrogen or halogen atoms, or alkyl, alkoxy, hydroxyalkoxy, cyano or carbalkoxy groups, and $R_3$ represents an alkyl group which may be substituted by a benzyl, acyloxy or hydroxy group.

It has been found that such benzothioxanthene dyestuffs can be obtained (a) By nitrating compounds of the formula

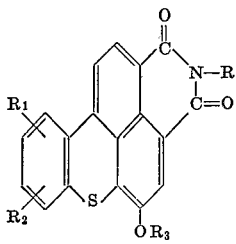

in which R, $R_1$, $R_2$ and $R_3$ have the meaning given above, or (b) First nitrating compounds of the formula

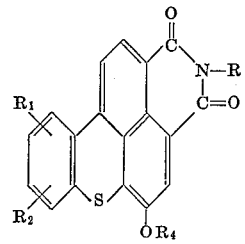

in which R, $R_1$ and $R_2$ have the meaning given above, and $R_4$ represents an acyl group which may be substituted, saponifying the acyloxy compounds thus obtained to yield the corresponding hydroxy compounds and subsequently alkylating them or (c) By nitrating compounds of the formulae

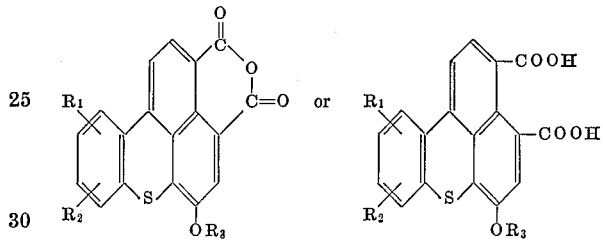

and by condensing the nitro compounds thus obtained with compounds of the formula

in which formulae R, $R_1$, $R_2$ and $R_3$ have the meanings given above.

It is advantageous to carry out the nitration according to methods (a) to (c) by suspending or dissolving the corresponding 6-alkoxy- or 6-acyloxy-benzothioxanthene-3,4-dicarboxylic acid imides or 6-alkoxy-benzothioxanthene-3,4-dicarboxylic acids or dicarboxylic acid anhydrides in organic solvents, for example, glacial acetic acid, acetic acid anhydride, chloroform, carbon tetrachloride, ethylene chloride, o-dichlorobenzene, nitrobenzene or dimethyl formamide, and adding dropwise to this suspension or solution at least the equimolar amount of nitric acid, suitably of a density of 1.4 to 1.5, if desired, after dilution with an above-described solvent. Depending on the solvent used the reaction temperature may vary within wide limits. Preferably, the nitration is carried out at a temperature in the range between about 15° and 80° C.

The dyestuffs formed by nitrating according to method (a) of the present invention may be isolated from the mixture directly or after dilution with a solvent having a low boiling point and precipitating the dyestuff, such as methanol. For separating the dyestuff it is, in some cases, suitable to remove the solvent from the reaction mixture, for example by distillation with steam.

In the case of those dyestuffs which are obtainable according to method (b) by using such starting compounds in which $R_4$ represents an acyl group which may be substituted, the nitration products of the acyloxy compounds are first isolated according to the above-mentioned method (a) and subsequently saponified according to known methods. The subsequent alkylation of the hydroxy compounds thus obtained is carried out in the manner usual for the alkylation of phenols. As alkylating agent, in particular, alkyl halides, dialkyl sulfates, aryl sulfonic acid esters and alkylene oxides, for example benzylchloride, dimethylsulfate, diethysulfate, p-toluene sulfonic acid methyl ester, ethylene oxide or propylene oxide are used.

The nitration products of the benzothioxanthene derivatives first obtained according to method (c) are converted into dyestuffs after having been isolated in usual manner by condensation with compounds of the above-mentioned formula $R-NH_2$. In this process, it is suitable to heat nitrobenzothioxanthene-3,4-dicarboxylic acids or dicarboxylic acid anhydrides with an excess amount of ammonia or amine in water or in an inert organic solvent, for example methanol, ethanol, isopropanol or in an ethylene glycol monoalkyl ether for a prolonged period of time, if necessary under pressure. It is advantageous to carry out the condensation at a temperature in the range between 70° and 160°. The dyestuffs formed precipitate from the reaction mixture and they may be isolated in the usual manner.

In addition to ammonia, hydroxylamine and hydrazines, there may be used as amines aliphatic, cycloaliphatic, aromatic, araliphatic and heterocyclic amines, for example methylamine, ethylamine, butylamine, isopropylamine, ethanol- or propanolamine, methoxyethyl-, methoxypropyl- or methoxybutylamines, butoxypropylamines, isopropoxypropyl-amines, methoxyethoxypropylamines, $\beta$-ethoxy-$\beta'$-($\Omega$-amino-propoxy) diethylethers, acetoxyethylamines, cyclohexylamine, cyclohexoxy-propylamines, anilines, anisidines, xylidines, cyclohexyl anilines, benzylamine, phenylethylamine, 5-aminobenzoxazol and 2-amino-3-methoxydiphenylene oxide, for carrying out the condensation with nitrated benzothioxanthene-dicabroxylic acids or their anhydrides.

The 6-alkoxybenzothioxanthene-3,4-dicarboxylic acid imides or the corresponding 6-hydroxy compounds still to be acylated, used as starting compounds according to method (a) are obtained by heating the diazonium compounds of 3-alkoxy- or 3-hydroxy-4-(2'-aminophenylmercapto)-naphthalic acid imides in the presence of copper or copper salts whereupon the hydroxy compounds thus obtained are acylated in the usual manner. The compounds to be used for method (c) may be prepared in an analogous manner, but instead of the naphthalic acid imides, the corresponding naphthalic acids or their anhydrides are used (French Patents Nos. 1,444,489 and 1,488,113).

The compounds obtainable according to the present invention are novel valuable dyestuffs having a red or bluish red shade and a high tinctorial strength which are extraordinarily suitable for dyeing synethetic material such as polyethylene-glycolterephthalate. They yield brilliant dyeings which are distinguished by good to very good fasteners properties, in particular to light, wetting and thermofixation. In connection with the tint of the dyestuffs obtainable according to the present invention it was surprising that the introduction of a nitro group into the molecule of the orange yellow starting compounds causes this considerable bathochromic shifting of the tint.

The following examples serve to illustrate the invention, but they are not intended to limit it thereto, the parts being be weight unless otherwise stated.

EXAMPLE 1

20.2 parts of 6-methoxybenzothioxanthene-3,4-dicarboxylic acid-N-$\gamma$-methoxypropylimide are suspended in a mixture of 60 parts of glacial acetic acid and 20 parts of acetic anhydride. Then, at 15°–20° C., a mixture consisting of 8.4 parts of concentrated nitric acid (of a density of 1.4) in 25 parts of glacial acetic acid is slowly added dropwise. In this process, the starting compound enters into solution and, after a short period, the reaction product starts crystallizing. The mixture is stirred for another 2 hours, the dyestuff obtained is filtered, washed with methanol and dried.

Analysis.—Calculated (percent): C, 61.3; H, 4.0; N, 6.2; S, 7.1. Found (percent): C, 61.0; H, 4.1; N, 6.4; S, 7.1; C, 61.4; H, 4.4; N, 6.5; 7.2

On polyester materials, this dyestuff yields brilliant red tints of good fastness to light and very good fastness to thermofixation and to wet processing as well.

EXAMPLE 2

To a mixture of 21.8 parts of 6,8-dimethoxybenzothioxanthene-3,4-dicarboxylic acid-N-$\gamma$-methoxypropylimide and 150 parts of chloroform, 9.0 parts of concentrated nitric acid (density 1.4) are added dropwise at room temperature and the batch is stirred for another 2 hours. When diluting the clear reaction mixture with 160 parts of methanol, the nitro compound formed precipitates in crystals. It is filtered with suction, washed with methanol and dried.

There is obtained a considerable yield of dyestuff which dyes polyester material a clear red tint of excellent fastness to light and thermofixation.

EXAMPLE 3

9.0 parts of 6-ethoxybenzothioxanthene-3,4-dicarboxylic acid-N-methylimide are suspended in 80 parts of nitro benzene. At 30° to 40° C., a solution of 1.95 parts of fuming nitric acid (density=1.5) in 6 parts of nitro benzene is added dropwise to this mixture and the whole is stirred for about another 3 hours, then diluted with 160 parts of methanol. The reaction product which has been isolated in the usual manner, dyes polyester material red tints.

EXAMPLE 4

To a suspension of 22.0 parts of 10-chloro-6-methoxy benzothioxanthene-3,4-dicarboxylic acid-N-$\gamma$-methoxypropylimide in 125 parts of ethylene chloride, a solution of 3.75 parts of fuming nitric acid (density=1.5) in 20 parts of ethylene chloride is added dropwise, at 60°–70° C. After the whole has been stirred for 3 hours at 60°–70° C., the ethylene chloride is distilled off with the aid of steam. The residue is treated with a hot dilute aqueous sodium hydroxide solution, filtered with suction, washed to neutral and dried.

There is obtained a dark red powder which dyes polyester material brilliant bluish red tints having very good general fastness properties.

EXAMPLE 5

43.2 parts of 6-acetoxybenzothioxanthene-3,4-dicarboxylic acid-N-$\gamma$-methoxypropylimide (obtainable by reaction of the corresponding 6-hydroxy compounds with acetic acid anhydride) are nitrated, at 40°–50° C., in the usual manner, in 350 parts of ethylene chloride with a mixture of 8.4 parts of fuming nitric acid (density=1.5) in 40 parts of ethylene chloride. Then, the mixture is stirred for about 3 hours. In this period, the raction product starts precipitating in orange colored needles. The mixture is diluted and worked up in the usual manner at room temperature with 400 parts of methanol. The nitration product thus obtained is saponified by boiling in 10 times the amount of a mixture of glacial acetic acid and concentrated hydrochloric acid in a ratio of 10 to 1 to yield the corresponding 6-hydroxy compound which is then methylated in usual manner by treating it with dimethyl sulfate in an alkaline solution. The reaction product thus obtained is identical with the dyestuff described in Example 1.

EXAMPLE 6

To a suspension of 12.0 parts of 6-benzyloxybenzothioxanthene-3,4-dicarboxylic acid-N-$\gamma$-methoxypropylimide in 63 parts of ethylene chloride, a solution of 1.9 parts of fuming nitric acid (density=1.5) in 7.0 parts of ethylene chloride is added dropwise at 60°–65° C. After having been stirred for 2 hours the reaction mixture is diluted with 90 parts of methanol. After a certain time, the dyestuff starts precipitating. It is filtered, washed with methanol and boiled out with a 5% aqueous sodium hydroxy solution. On polyester materials, this dyestuff yields clear red tints.

EXAMPLE 7

2.5 parts of 6-methoxybenzothioxanthene-3,4-dicarboxylic acid anhydride are suspended in 60 parts of ethylene chloride and the whole is nitrated at 60°–65° C. with a solution of 0.55 part of fuming nitric acid (density=1.5) in 2.5 parts of ethylene chloride. After having been stirred for 2 hours at 60°–70° C., the nitration product which has precipitated in dark red crystals, is filtered; when cool it is washed with methanol and dried.

1.14 parts of nitro-6-methoxy-benzothioxanthene-3,4-dicarboxylic acid anhydride thus obtained, 0.33 part of γ-methoxy-propylamine and 15 parts of methyl glycol are kept at the boil for 3 hours. When cool the dicarboxylic acid imide which crystallizes in dark red needles is filtered with suction, washed with methanol and dried. It is identical with the dyestuff described in Example 1.

The following table comprises further dyestuffs obtainable according to the methods described in the above-mentioned examples and which have the following formulae:

1.
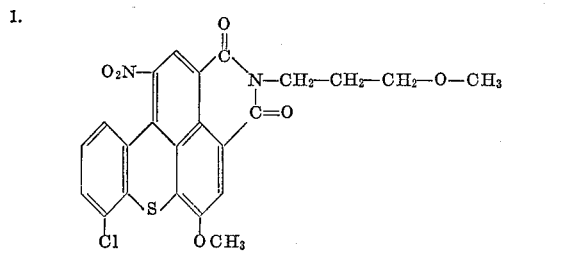

2.
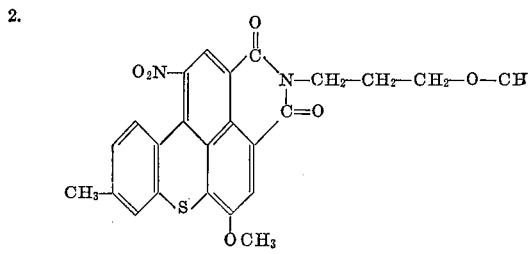

3.
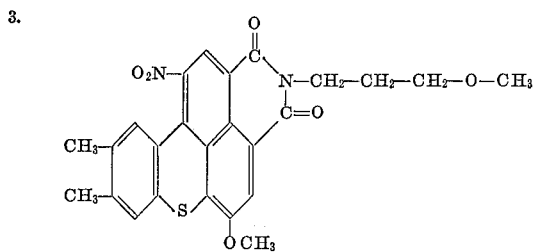

4.
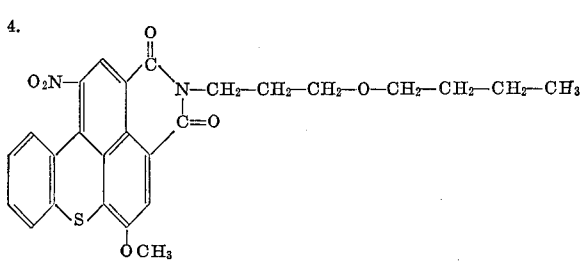

5.
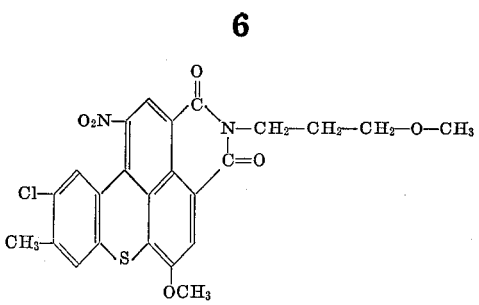

6.
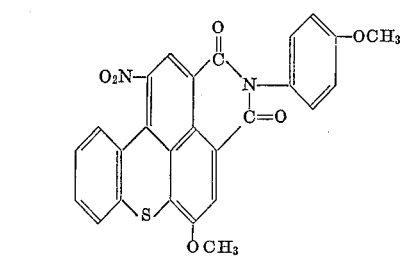

7.
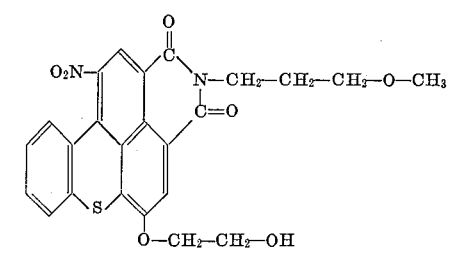

8.
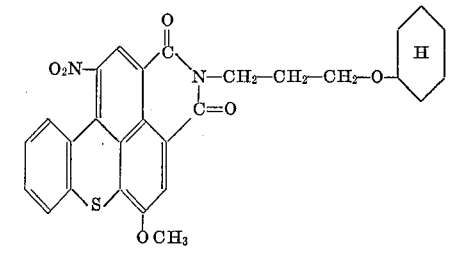

9.
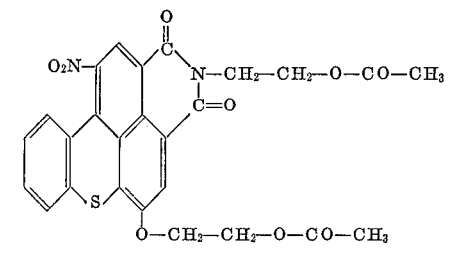

10.

11.
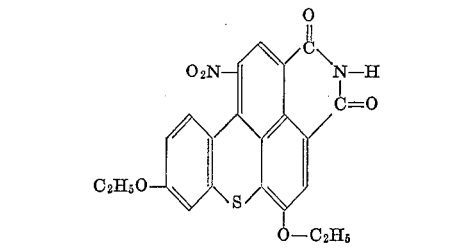

12.

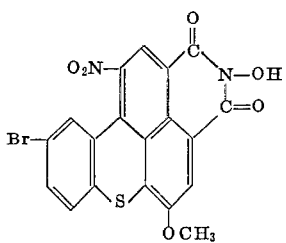

We claim:
1. A dyestuff of the formula

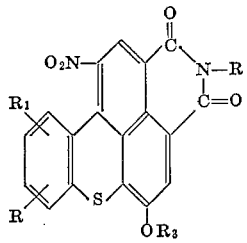

in which R is a hydrogen, hydroxy, amino, lower alkyl, hydroxy lower alkyl, lower alkoxy lower alkyl, lower alkoxy-alkoxy-alkyl, lower alkoxy - alkoxy - alkoxy - alkyl, acetoxy lower alkyl, cyclohexyl, cyclohexoxy lower alkyl, phenyl, lower alkoxy phenyl, lower alkyl phenyl, cyclohexyl phenyl, benzyl, phenyl ethyl, benzoaxazol-5-yl or 3-lower alkoxy diphenylene-oxide-2-yl group, $R_1$ and $R_2$ each is a hydrogen, chlorine, bromine, lower alkyl, lower alkoxy, hydroxy lower alkoxy, cyano or carbalkoxy group, and $R_3$ is a lower alkyl, hydroxy lower alkyl, lower alkanoyloxy lower alkyl or benzyl group.

2. A dyestuff of the formula

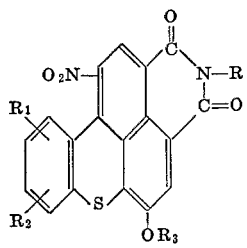

in which R is a hydrogen, hydroxy, amino, lower alkyl, lower alkoxy lower alkyl, cyclohexoxy lower alkyl, lower alkyl phenyl or acetoxy lower alkyl group, $R_1$ and $R_2$ each is a hydrogen, chlorine, bromine, lower alkyl or lower alkoxy group, and $R_3$ is a lower alkyl, hydroxy lower alkyl, acetoxy lower alkyl or benzyl group.

3. Dyestuff of the formula

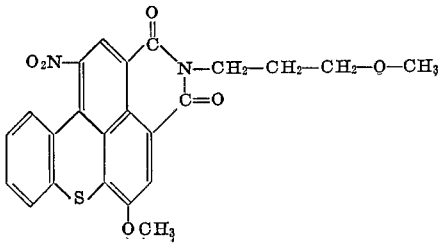

4. Dyestuff of the formula

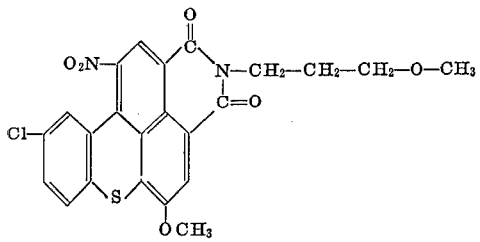

5. Dyestuff of the formula

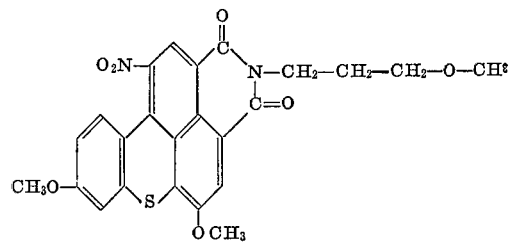

6. Dyestuff of the formula

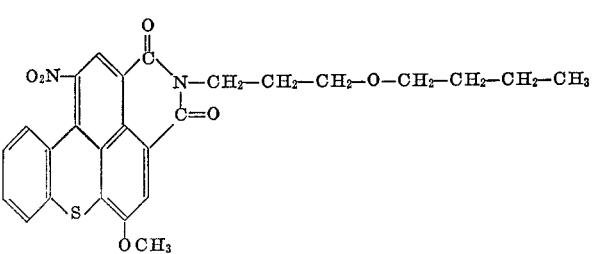

7. Dyestuff of the formula

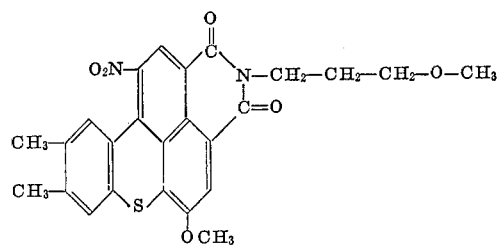

References Cited
UNITED STATES PATENTS

| | | | |
|---|---|---|---|
| 1,052,507 | 2/1913 | Neresheimer | 260—277 |
| 2,961,438 | 11/1960 | Fuchs et al. | 260—281 X |
| 3,357,985 | 12/1967 | Fuchs et al. | 260—281 |
| 3,310,564 | 3/1967 | Kasai | 260—281 |
| 3,324,133 | 6/1967 | Arcamone | 260—688 X |
| 3,330,834 | 7/1967 | Senshu | 260—281 |
| 3,340,264 | 9/1967 | Walker | 260—281 |
| 3,367,937 | 2/1968 | Fuchs et al. | 260—281 |
| 3,376,303 | 4/1968 | Fuchs et al. | 260—281 X |

OTHER REFERENCES
Neblette, "Photography," 9th ed., 1943, p. 348.

DONALD G. DAUS, Primary Examiner

U.S. Cl. X.R.

8—55; 260—307, 328, 688